United States Patent [19]

Mazur et al.

[11] Patent Number: 4,702,804
[45] Date of Patent: Oct. 27, 1987

[54] METHODS FOR ELECTROCHEMICAL REDUCTION OF HALOGENATED ORGANIC COMPOUNDS

[75] Inventors: Duane J. Mazur; Norman L. Weinberg, both of Amherst, N.Y.

[73] Assignee: PCB Sandpiper, Inc., Columbus, Ohio

[21] Appl. No.: 9,715

[22] Filed: Feb. 2, 1987

[51] Int. Cl.$^4$ .......................... C25C 1/00; C02F 1/46
[52] U.S. Cl. .................................. 204/73 R; 204/78; 204/131; 204/138; 204/149; 204/151; 204/152
[58] Field of Search ..................... 204/73 R, 149, 131, 204/78, 138, 152, 151; 210/42 R, 64

[56] References Cited

U.S. PATENT DOCUMENTS

| | | | |
|---|---|---|---|
| 3,694,332 | 9/1972 | Parker | 204/73 R |
| 3,788,967 | 1/1974 | Kawahata et al. | 204/149 |
| 3,793,173 | 2/1974 | Kawahata et al. | 204/149 |
| 4,046,663 | 9/1977 | Fleet et al. | 204/149 |
| 4,161,435 | 7/1979 | Moeglich | 204/149 |
| 4,326,938 | 4/1982 | Dasgueta et al. | 204/149 |
| 4,443,309 | 4/1984 | Vanduin | 204/149 |
| 4,470,892 | 9/1984 | Dasgueta et al. | 204/149 |
| 4,585,533 | 4/1986 | Habeeb | 204/131 |
| 4,588,484 | 5/1986 | Justice et al. | 204/73 R |

OTHER PUBLICATIONS

D. Schmal et al., Electrochemical Reduction of Halogenated Compounds in Process Waste Water; Electrochemical Engineering, The Institution of Chemical Engineers, Symposium Series No. 98; 259–269 (1986).

Primary Examiner—Arthur P. Demers
Attorney, Agent, or Firm—Howard M. Ellis

[57] ABSTRACT

A process for the electrochemical destruction of halogenated organic compounds provides for the reduction of such compounds to levels below 1 ppm with carbonaceous cathodes which are principally amorphous carbon sufficiently graphitized to enhance the rate of the reaction without substantial reduction in stability to electrochemical corrosion.

18 Claims, 2 Drawing Figures

METHODS FOR ELECTROCHEMICAL REDUCTION OF HALOGENATED ORGANIC COMPOUNDS

BACKGROUND OF THE INVENTION

The present invention relates generally to methods for dehalogenation of organic compounds, and more specifically, to improved methods for dechlorinating aromatic hydrocarbons electrochemically.

Halogenated organic compounds have many important commercial applications, such as in agriculture and medicine. Some halogenated compounds, in particular polychlorinated biphenyls (PCB's), have specially attractive properties, such as low melting points, low flammability, low volatility and high stability to chemical and biodegradation. As a result, there has been wide spread use of PCB's as insulating materials in electrical equipment, fire retardants, heat exchange liquids, plasticizers and many other industrial applications. However, PCB's and other halogenated organics have become health hazards. PCB's for instance, once absorbed tend to deposit and remain in fatty tissue and can accumulate to toxic levels.

Significant efforts have been made to develop effective means for eliminating these highly stable compounds from the environment. One means for recovering and destroying halogenated organics involves a multi-step extraction-dechlorination process wherein a liquid carrier contaminated with PCB's, such as oil from transformers, is treated with specially selected organic solvents which are immiscible in the liquid carrier but will extract the halogenated compounds therefrom. The solvent containing the PCB's is separated from the carrier which can then be recycled for further use. The contaminated nonaqueous solvent stream is then dehalogenated electrochemically in a cell equipped with an anode and cathode. An electric potential impressed across the anode and cathode reduces the halogenated organic compounds at the cathode. Advantages of the process include the ability to treat liquid carriers, e.g. oil, having high concentrations of PCB's while permitting reclamation of the carrier liquid. A further advantage is that it does not produce a residue which is difficult to dispose. It can also be scaled to handle smaller quantities of liquids typically found in electrical transformers. One such electrolytic dehalogenation process is disclosed in co-pending U.S. application Ser. No. 643,148, filed Aug. 28th, 1984 by Harlan J. Byker.

In conducting electrolytic dehalogenation processes cells may be equipped with membranes separating reactions taking place at the cathode and anode. The anode, for example, may be a dimensionally stable type, e.g. titanium coated with ruthenium dioxide, carbon and the like. Cathodes may be solid metal, such as zinc, lead, tin or liquid metals, such as mercury. It was found, however, that in electrolytic dehalogenation processes metal cathodes did not fully destroy PCB's down to levels of less than 1 ppm as required by government environmental regulations. In addition, metal cathodes became corroded during electrolysis resulting in a fall in current efficiency. Although mercury in many cases has been the cathode of choice, it too has shortcomings, namely low current density, potential for environmental problems and the inability to obtain high surface areas for scale up.

Carbon electrodes have also been suggested in electrolytic dehalogenation processes. For example, European application No. 27,745 discloses graphite electrodes generally in the degradation of 2,7-dichlorodibenzo-p-dioxin and PCB's. U.S. Pat. No. 4,161,435 discloses an electrochemical process for reducing the level of contaminants, including PCB's in an aqueous electrolyte containing graphite flakes. The electrodes without identifying whether they are anodes or cathodes are said to comprise stainless steel, aluminum, platinum or a platinum group metal, as such, or coated onto titanium or tantalum or a non-metallic conductor, such as carbon (graphite). The electrode is said to be any convenient form, e.g. solid or perforated bar, woven cloth or fiberous form. U.S. Pat. No. 4,443,309 discloses a process for the electrochemical detoxification of organic compounds, including halogenated hydrocarbons of 1 to 10,000 ppm. An electrode material of carbon or graphite fibers can be used.

Notwithstanding their generally accepted use in electrochemical dehalogenation reactions, it was discovered that many carbon electrodes undergo degradation and have short useful lives and are basically unreliable. In the case of carbon anodes, it is known that they undergo oxidation. But in the case of cathodes the reasons for their deterioration are less clear. One theory may be, that possibly radical species form in solution, such as through the reduction of oxygen to peroxide, which can attack the carbon. One other possible theory is that radical species from the electrolyte components also attack the cathode. A further theory in the case of graphite is the intercalation process wherein ions or molecules in solution migrate between basal planes of the carbon to cause fracturing.

Accordingly, there is need for a more reliable process for the electrochemical destruction of halogenated organic compounds to very low levels which will meet government regulations, including one which is capable of destroying even low levels of halogenated aromatic compounds, i.e. 100 ppm or less in solution, at high conversion efficiencies.

BRIEF DESCRIPTION OF THE INVENTION

It is a principal object of the present invention to provide an improved process for the dehalogenation of organic compounds, and particularly, streams contaminated with halogenated aromatic compounds, like PCB's to reduced levels of less than 1 ppm.

A still further object of the present invention is to provide a process for the synthesis of organic compounds by the electrolytic dehalogenation of aromatic compounds by means of electrochemical cells equipped with cathodes which are more stable, and therefore, more reliable.

A still further object of the invention is to provide a novel electrochemical process for the destruction of halogenated organic compounds while avoiding the problem of corrosive deterioration by employing beds of carbonaceous material for their cathodic reduction.

Generally, the dehalogenation process comprises the steps of providing an electrolytic cell having an anode, a cathode and an electrolyte comprising a halogenated organic compound, and impressing a voltage across the anode and cathode sufficient to reduce the organic compound at the cathode. In one embodiment, the reaction is conducted in the presence of an electrochemically corrosion resistant carbonaceous, three dimensional cathode. The corrosion resistant carbonaceous cathode may be an amorphous carbon, and more preferably, one which is partially graphitized amorphous carbon for greater reactivity in the reduction of the halogenated compounds to very low levels.

The process of detoxifying a liquid comprising a halogenated aromatic compound may also be practiced by the steps of extracting and separating the halogenated compound from a carrier with an organic solvent to form a carrier having a reduced level of halogenated aromatic compound and an organic solvent enriched in the compound, and electrolyzing the halogenated aromatic compound in a nonaqueous electrolyte in an electrolytic cell having an anode and a cathode by impressing a voltage across the anode and cathode. The dehalogenation reaction is conducted in the presence of an electrochemically corrosion resistant, three dimensional, high surface area carbonaceous cathode.

As a further embodiment, the process of the present invention may be carried out by conducting the electrolyte comprising the halogenated organic compound through a bed of particulate carbon, including graphitic and amorphous carbons. The carbon may be a static bed of packed particulate material, or alternatively, a dynamic fluidized bed of carbon particles.

These and other features and advantages will become more apparent from the following detailed description of the invention.

DESCRIPTION OF THE DRAWINGS

For a further understanding of the invention as well as its characterizing features, reference should now be made to the following detailed description thereof taken in conjunction with the accompanying drawing, wherein.

DETAILED DESCRIPTION OF THE INVENTION

Figure 1:
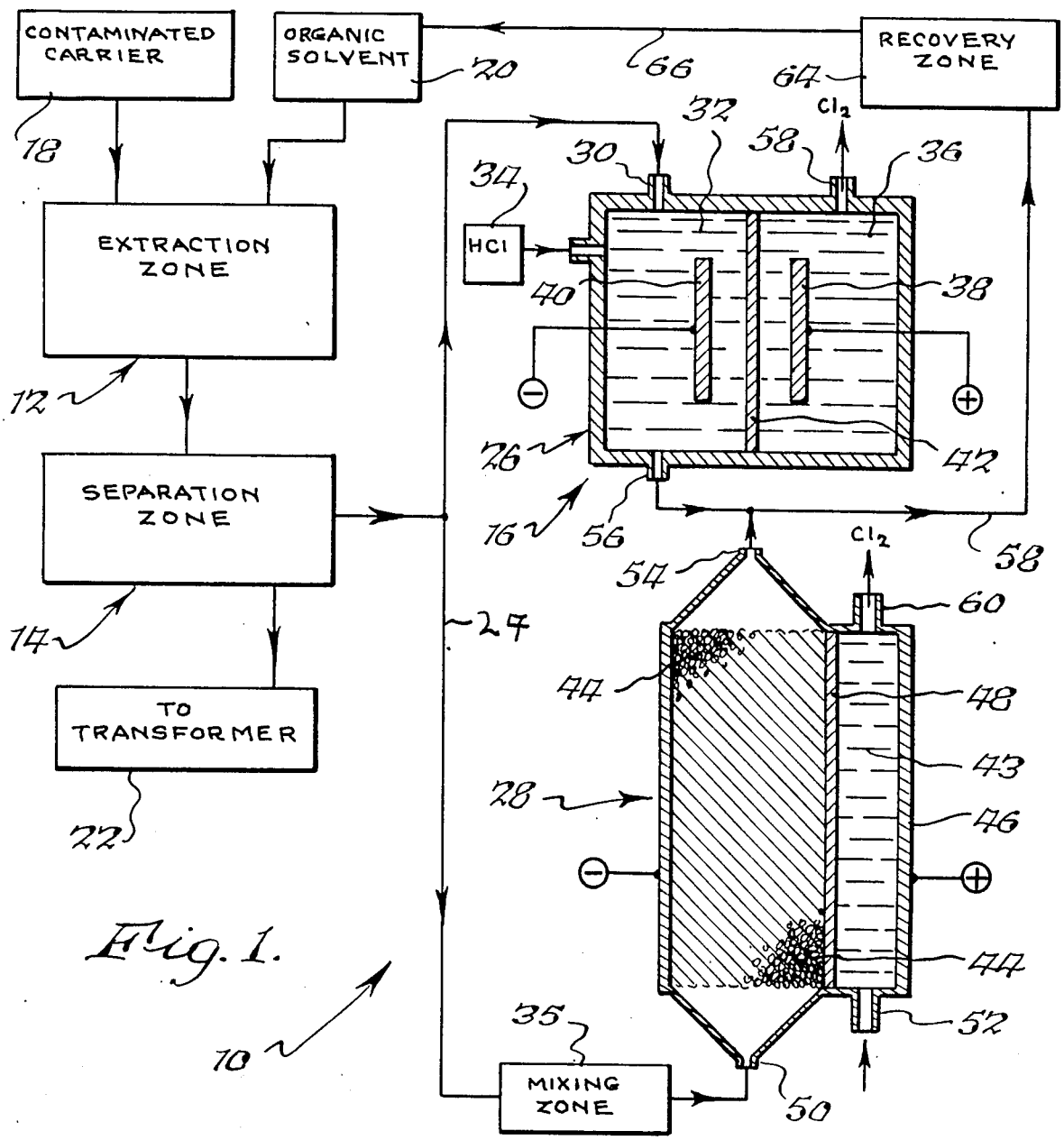
FIG. 1 is a flow diagram of the dehalogenation/synthesis process showing electrolytic cells with carbon cathodes.

The present invention relates to the discovery of an improved process for the electrolytic dehalogenation of organic compounds, such as mono and polyhalogenated aliphatic compounds like trichlorethylene, carbontetrachloride, aralkyls, such as substituted benzotrichlorides, and DDT, to name but a few. However, the process also relates to the dehalogenation of aromatic compounds, such as polychlorinated biphenyls, mono and polyhalogenated benzenes and phenols, and the like. The process is not only effective in purifying solutions contaminated with halogenated compounds, but also provides an efficient means for the destruction of the potentially toxic components down to very low levels, i.e. less than 1 ppm without the formation of unwanted residues, etc. For purposes of this invention the term—halogen—is intended to mean principally chloro, bromo and iodo, and in some instances fluoro. Accordingly, —dehalogenation—means the removal of at least one halogen from a mono or polyhalogenated compound.

Many forms of carbon were found to be generally capable of reacting in the electrolytic destruction of halogenated aromatic compounds. It was also discovered, however, that many carbons deteriorated after operating in cells within a short time period. Because of this reliability problem, many were found to be unsuitable as cathode materials, particularly for commercial installations. Surprisingly, it was discovered that only certain high porosity, high surface area three-dimensional carbons were sufficiently stable and had operating life expectancies which permitted their continuous operation in dehalogenation reactions without undergoing corrosive deterioration, e.g. exfoliation. For example, in the destruction of PCB's, porous, high surface area, three-dimensional carbon structures, such as found in certain felts and cloths, and possibly other filamentary structures like carbon fibers, tapes and yarns, were discovered to possess good stability to electrolytic dehalogenation reactions while also demonstrating a high degree of electrochemical reactivity with the compounds. By comparison, other carbons, like porous and non-porous graphites, graphite foils, rods, including glassy carbons, and amorphous carbons having highly graphitized structures were found to be quite unstable, and most were found nonresistant to undergoing corrosion. Similarly, amorphous carbons which have low or practically no graphitization or which are free of graphitic structures demonstrate lower levels of reactivity with halogenated organic compounds, and therefore, the ability to reduce the compounds to the desired low levels is more difficult and less economic.

For purposes of the present invention expressions like "electrochemically corrosion resistant" with respect to the carbonaceous materials disclosed and claimed herein are intended to mean principally amorphous types of electrically conductive carbons which are at least partially graphitized. Partially graphitized, generally means at least about 5 percent of the carbon is graphitic carbon and the balance (95 percent) is amorphous. Highly graphitized carbons, possibly greater than 50 percent are subject to attack and corrosion and fall apart possibly as a result of their more ordered molecular structure, closer spacing between monoplanes and stacks and lower surface areas in the graphitic structures. In other words, those carbons which are predominately graphitic are unstable in electrolytic dehalogenation reactions.

Accordingly—corrosion resistant carbonaceous cathodes—are intended to mean, amorphous carbons having sufficient graphitization to enhance reactivity without substantially reducing resistance to corrosion. Amorphous carbon may be characterized generally as having imperfectly ordered molecular structures with relatively high surface areas. Planes of atoms are layered, irregular and unoriented without extensive growth in any direction. Compared to graphitic structures which lack crosslinking of planes, amorphous carbons are crosslinked between planes. Representative examples of suitable amorphous carbons include carbon blacks, like lamp black, thermal black, channel black, acetylene black, furnace blacks, to name a few. Other amorphous carbons include activated carbons and charcoal. To this end, the amorphous carbonized material can be coverted to partially graphitic materials by controlled heating at temperatures generally in excess of 2000° C. by known methods through exercise of ordinary skill.

The geometry of the porous carbonaceous cathodes, particularly carbon felts, cloths, etc., are three-dimensional meaning structures having more than simply length and width, but also depth. That is, because the porous cathodes have internal working surfaces in contact with electrolyte, mass transfer is improved and the cell can operate at higher current densities without decomposing solvent and supporting electrolytes.

Ideally, surface area of the porous carbon cathodes should be sufficient to provide overall current efficiencies from the beginning to the end of the reaction of at least 5 percent, usually in the case of very dilute solutions, e.g. less than 100 ppm of halogenated aromatic compound. More preferably, a current efficiency of at least 10 percent is desired for minimizing capital requirements and operating costs in terms of power consumption. However, quite surprisingly with the cathodes of the present invention, current efficiencies of 20 percent to about 40 percent have been achieved with commercially available carbon felts and cloths. Higher overall current efficiencies can be achieved with higher initial levels of halogenated compounds in the electrolyte. Representative examples of such carbon felts are those available from The Electrosynthesis Company, Inc. of E. Amherst, N.Y. under the under the designation GF-S5and GF-S6 which are ¼" and ½" thick materials respectively. Thinner, high surface area porous carbonaceous materials represented by carbon fabrics which include fabrics having, for instance, plain and jersey knit construction may also be employed without exfoliation occurring. Carbon cloth is also intended to include carbon fiber fabrics. Although some manufacturers may refer to carbonaceous materials, for instance, as being "graphite felt" it has been found through analysis that in some instances such materials are principally amorphous carbon, suggesting the carbonizing temperatures for such materials are controlled to convert only part of the carbon to graphite. In any event, the porous, high surface area carbonaceous materials of the present invention are intended to include these so-called "graphite" materials.

The porous, high surface area, three-dimensional carbon cathodes are not to be confused with carbon electrodes associated with other electrolytic cell processes, which electrodes are relatively non-porous and have low surface areas.

The dehalogenation methods of the present invention can be demonstrated by reference to FIG. 1, which shows a dehalogenation system 10, comprising an extraction zone 12, separation zone 14 and electrolyzing zone 16. Generally, the process provides for cleansing a liquid carrier in extraction and separation zones 12 and 14 with an extraction solvent 20. The liquid carrier contains the halogenated aromatic compound which may be, for instance, transformer oil 18 contaminated with PCB's. The solvent rich in PCB's is then treated in electrolyzing zone 16 where the PCB's are cathodically reduced to compounds of lesser toxicity, greater disposability and/or reusability. In the extraction zone, contaminated carrier 18 is mixed with a suitable organic solvent 20 in a vessel fitted with agitation means, such as a motorized stirrer. In this case, because of the low solubility of PCB's in water and for other reasons discussed below, the system is preferably—nonaqueous—. For purposes of the present invention the term "nonaqueous" is intended to mean the electrolyte is free or practically free of water, or in other words, the extraction solvent 20 which becomes part of the catholyte is an organic solvent which contains less than about 5 percent by weight water. More specifically, the solvent/electrolyte contains from about 0 to about 5 percent by weight water.

Solvent 20 should possess the requisite properties of solvating the halogenated aromatic compounds while being virtually immiscible in contaminated liquid carrier 18. In addition, the solvent should be electrochemically stable and not undergo oxidation at the anode or reduction at the cathode during electrolysis. The solvent should also be chemically stable/inert to elemental chlorine generated at the anode and chloride ions formed at the cathode. Representative of the solvents possessing such properties, include but are not limited to cyclic ketones like cyclopentanone; lactone solvents, such as valerolactone, butyrolactone, and the like. The most preferred class of ketone solvents are the cyclic carbonate solvents like propylene carbonate and ethylene carbonate.

The extracted mixture comprising carrier oil having a diminished level of PCB's and organic solvent enriched in PCB's is transferred to separation zone 14 comprising a settling tank where the two are allowed to separate into an upper oil phase and a lower solvent phase. The decontaminated transformer oil is drawn off to the transformer oil pool 22 for recycling and the organic solvent rich in PCB's is treated in electrolyzing zone 16 comprising an electrolytic cell 26 having an electrochemically corrison resistant, three-dimensional, porous, high surface area carbonaceous cathode. Alternatively, the solvent can be efficiently treated in an electrolytic cell 28 equipped with a cathode comprised of a bed of particulate carbon.

The solvent, rich in chlorinated aromatic compounds coming off the separation zone 14 is also preferably nonaqueous as defined hereinabove, although the present invention contemplates aqueous systems as well. In the case of nonaqueous systems higher cathode conversion efficiencies are realized, since energy is not expended in electrolyzing water. Such nonaqueous systems usually provide current efficiencies of at least 10 percent, and more preferably, in a range from about 15-50 percent. Accordingly, processes of the present invention have the added advantage of being more economic than other dehalogenation methods.

The PCB contaminated solvent enters the electrolyzer circuit line 24 where it is delivered via catholyte inlet 50 to cell 28 having a cathode 44 comprised of a packed bed of carbonaceous material. Alternatively, the contaminated solvent may be treated in cell 26 equipped with a high porosity, three-dimensional, corrosion resistant carbon cathode 40. The solvent enters the catholyte compartment through inlet 30. Catholyte 32, including the anolyte 36 utilize conventional current carriers used in electrolytic processes, such as quaternary salts like tetraethylammonium chloride. Catholyte 32 should also have a source of protons, since reduction of the halogenated aromatic compound at the cathode, such as in the case of PCB's, involves replacement of chlorine with hydrogen. Therefore, hydrochloric acid 34 is added to the catholyte as a source of hydrogen ions.

Although cells 26 and 28 may be undivided, the anolyte and catholyte compartments are shown divided by separator means 42 and 48 which may be a porous diaphram, like microporous separators formed of polytetrafluoroethylene (PTFE) and other polyhalogenated resinous materials, ceramic frits, etc. Also included, are the widely known ionic permselective membranes.

Anodes 38 and 46 may be, for example, any of the commercially available dimensionally stable precious metal types, like titanium coated with a layer of ruthenium dioxide, although carbon and other suitable materials can also be employed.

Figure 2:
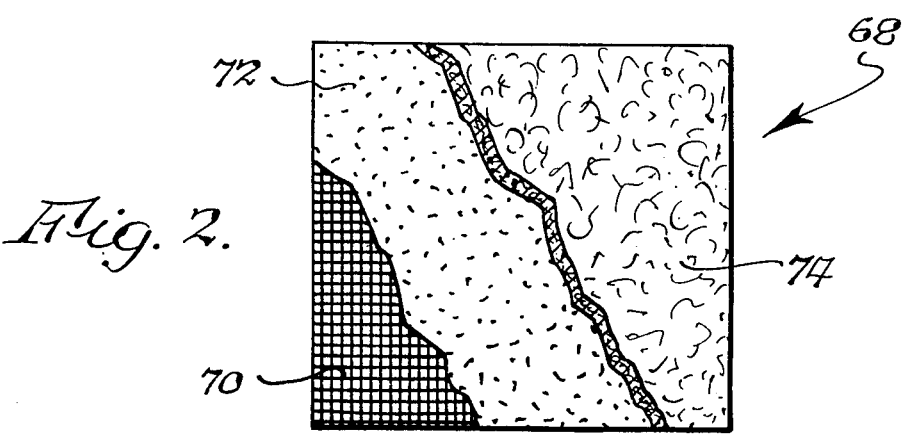
FIG. 2 is an enlarged partial cutaway view of the three-dimensional cathode of the cell illustrated in FIG. 1.

The cathodes 40 and 44 of electrolytic cells 26 and 28, respectively, have high surface areas of electrically conductive carbons as previously described. The three-dimensional cathodes of cell 26 are shown in greater detail in FIG. 2 where mounted cathode 68 comprising a ⅛" to ¼" thick sheet of carbon felt 74 is brought into electrical contact with current carrying medium 70, such as a steel screen, carbon or graphite core by techniques familiar to those of ordinary skill in the art. For instance, carbon felt 74 can be bonded to screen 70 by means of any commercially available conductive graphite-epoxy cement 72. Carbon cloths/felts, etc., can also be held in place by appropriate mechanical means, such as compression clamps (not shown).

In addition to the fixed, three-dimensional cathodes of cell 26, the present invention contemplates alternative cell designs, such as flow-through cell 28 which also relies on high surface area carbons, but in particulate form. Cathode 44 is shown as a high surface area static/stationary bed of particulate carbon particles in intimate contact. However, the carbon particles can be used in any dynamic state, such as in a fluidized bed. The particulate carbon particles used in the stationary and moving beds can be any of the amorphous or graphitic type carbons. However, as in the case of the porous, three-dimensional carbon electrodes 40, they are generally preferred to be principally amorphous carbon particles having sufficient levels of graphitization to enhance the rate of reactivity with halogenated organics, but at levels which will not lessen stability to electrochemical corrosion.

In operation of electrolytic cell 28 contaminated solvent from separation zone 14 is mixed in zone 35 with tetraethylammonium chloride or other equivalent quaternary compound and hydrochloric acid and is delivered to the carbon bed. The contaminated electrolyte may be fed upwardly from the bottom of the cell through inlet 50. Anolyte is fed through inlet 52. Chlorine gas produced at the anode can be drawn off at outlets 58 and 60 of each of the illustrated cells. Catholyte-solvent which has been electrolyzed should preferably have residual levels, e.g. PCB's below 1 ppm. By-products like biphenyl and chloride ion will also be present. Treated catholyte is drawn off at 54 and 56, fed through solvent recycle line 58 for delivery to solvent recovery system 64 where biphenyl and other products building up in the solvent are removed by conventional known means. Treated solvent can then be reused in the process by returning to holding tank by way of line 66.

The following specific examples demonstrate various aspects of the present invention, however, it is to be understood that these examples are for illustrative purposes only and do not purport to be wholly definitive as to conditions and scope.

EXAMPLE I

An electrolytic cell system for synthesis/dehalogenation reactions may be set-up as follows:

A three-compartment glass laboratory cell is used having a total capacity of 200 ml with a porous frit separator for each compartment. The process may also be conducted without such separator. The first compartment is equipped with a 4 $cm^2$ platinum anode or a 10 $cm^2$ graphite anode. The cathode is comprised of a 12 cm×¼" thick Stackpole brand SGF-6 graphite felt which is principally amorphous carbon with approximately 10 to 20% graphitic carbon. The felt is bonded to a solid piece of graphite with a graphite epoxy cement, such as available under the designation Dylan Graphite Cement, a product of Dylan Industries, Cleveland, Ohio. The third compartment is equipped with a silver reference electrode.

The electrolyte for the cathode and anode compartments comprises a 1.0 molar solution of tetraethylammonium chloride in propylene carbonate. A PCB contaminated oil comprising about 700 ppm of the chlorinated isomers or a solution of pure PCB oil is added to the catholyte compartment. The power supply can be connected to a potentiostat. The cell is operated for 4 hours, and the catholyte analyzed by gas chromatography. The PCB level of the catholyte is under 1 ppm. The cathode at the end of the reaction shows no visual corrosion or exfoliation.

EXAMPLE II

In order to demonstrate the effectiveness of carbon felts in the destruction of low concentrations of PCB's, an electrolytic cell similar to that of Example I was set-up with the 12 $cm^2$ graphite felt cathode, 10 $cm^2$ graphite anode and silver reference electrode. The cell was undivided. The cell was filled with 100 ml of a 1.0 molar solution of tetraethylammonium chloride in propylene carbonate. 503 ppm of mixed isomers of PCB's was added to the electrolyte. In addition, 700 ppm cyclohexene was added to the electrolyte to react with the chlorine generated at the anode to prevent rechlorination of the biphenyl by-product. The cell was operated for 620 Coulombs at a potential of $-1.75$ volts vs the silver wire. Analysis showed that the PCB level was taken down to less than 1 ppm at an overall cathode current efficiency of 41.4 percent.

EXAMPLE III

The same cell set-up described in Example II was used except 50 ml of the 1.0 molar tetraethylammonium chloride electrolyte in propylene carbonate was used with 700 ppm cyclohexene. 50 ml of silicone oil contaminated with 688 ppm of PCB mixed isomers was added to the cell and vigorously stirred to create an emulsion extracting in-situ the PCB's from the oil. 400 Coulombs of current was passed at a potential of $-1.75$ vs the silver wire. Analysis showed the PCB level to be less than 1 ppm operating at an overall current efficiency of 41.0 percent.

EXAMPLE IV

An electrolytic cell is set-up with a packed bed of particulate carbon particles. The cell is an ElectroSyn SU type cell available from Electrocell AB, Stockholm, Sweden. The carbon bed consisting of 2 cell frames measuring 30 cm high, 15 cm wide and 1.2 cm in depth is made up of graphite particles (1-2 mm) loosely packed against a graphite current carrier. A polypropylene felt is used to retain the particles in place. A graphite anode is utilized in the next adjoining frame, so the electrode gap between the cathode bed and the anode is approximately 5 mm. The electrode surface area is 400 $cm^2$. An emulsion of PCB-contaminated mineral oil and a 1.0 molar tetraethylammonium chloride in propylene carbonate (1:1) is pumped through the cell at a rate of 2 gallons per minute. The cell is run at a constant current of at least 20 mAmp/$cm^2$ in order to effect PCB reduction.

EXAMPLE V

In order to compare the performance of various materials in the cathodic reduction of halogenated organic compounds, a 3-compartment divided (porous separator) cell was set-up using 100 ml of a 1.0 molar tetraethylammonium chloride solution in propylene carbonate. A silver reference electrode and a graphite anode (10 cm$^2$) were used. The cathode materials tested are listed in the table below. The cathode surface areas were between 10 and 20 cm$^2$. After 1.15 grams of 4,4'-dichlorobiphenyl (10,000 ppm) was added to the cathode solution and the cell was operated at a potential of $-1.75$ to $-2.00$ vs. between the cathode and reference electrode. Voltage was applied to the cell until approximately 10 times the theoretical value of current was passed for a complete PCB reduction. At the conclusion of each run, the catholyte was analyzed by gas chromatography. In addition, the cathodes were examined at the completion of each run for corrosion. The results of the testing are provided in the table below.

TABLE

| Electrode* | PCB destruction (%) | Current Efficiency | Current Density (mA/cm) | Comments |
| --- | --- | --- | --- | --- |
| Pure Graphite Rod (Spectrotech) | 93 | 25 | 17.5 | exfoliation |
| Reticulated Vitreous Carbon | 84 | 21 | 20 | no exfoliation, but did not take PCB level down sufficiently |
| Zinc | 80 | 14 | 9.5 | must be careful about battery effect, poor PCB reduction |
| Copper | 73 | 19.8 | 8.7 | surface of electrode stays red throughout reduction, poor PCB reduction |
| Cadmium | 49 | 18.9 | 7.5 | PCB level not sufficiently low |
| Spongy Silver | 46 | 13.4 | 12 | spongy surface deteriorates during reduction |
| Nickel | 55 | 12.5 | 4.5 | significant gas evolution |
| Vanadium | 52 | 14.5 | 10 | electrode becomes coated |
| Aluminum | 60 | 16 | 5.0 | Al lost to solution, very dark |
| Tin | 99 | 17.6 | 8.5 | Sn lost to solution |
| Lead | 42 | 16 | 10 | Pb lost, later plates out. PCB reduction level poor |
| Mercury** | 99.9 | 40.0 | 0.1 | very low current density, Hg lost to solution |
| Titanium Oxide | 0 | 0 | 17 | unsuitable, no PCB destruction |
| Stainless Steel | 0 | 0 | 9 | unsuitable, no PCB destruction |
| Graphite felt (Electrosynthesis) | 99.6 | 27.9 | 26 | no solvent darkening; no signs of corrosion |
| Graphite foil | — | — | — | fell apart |
| Porous Graphite (Stackpole) | 83 | 23.9 | 18 | unsuitable, electrode falls apart |
| Glassy Carbon | 0 | 0 | 23 | unsuitable, no PCB destruction |

*All experiments performed with 10,000 ppm of 4,4'-dichlorobiphenyl in propylene carbonate with 1.0 M ET$_4$NCl as electrolyte.
**With 16,000 ppm Askarel oil.

The above table compares the performance of various materials used as cathodes in the electrochemical dehalogenation of a chlorinated aromatic compound. Most of the metallic cathodes showed signs of deterioration and failed to provide a satisfactory decrease in the level of chlorinated compound. The mercury cathode provided a high level of PCB destruction, but operated at a very low current density. The carbon cathodes, and particularly those which were highly graphitized became severely corroded. The porous, high surface area amorphous carbon felt, which was approximately 10 to 20 percent graphitized, demonstrated high performance in terms of dehalogenation at high current efficiencies while operating a high current density.

While the invention has been described in conjunction with specific examples thereof, this is illustrative only. Accordingly, many alternatives, modification and variations will be apparent to persons skilled in the art in light of the foregoing description, and it is therefore intended to embrace all such alternatives, modifications and variations as to fall within the spirit and broad scope of the appended claims.

What is claimed is:

1. In a process for the dehalogenation of organic compounds by the steps of providing an electrolytic cell having an anode, a cathode and an electrolyte comprising a halogenated organic compound, and impressing a voltage across said anode and cathode sufficient to reduce the halogenated organic compound at the cathode, the improvement comprising conducting the reaction in the presence of a carbonaceous, high surface area cathode, said cathode being an amorphous carbon sufficiently graphitized to enhance dehalogenation without a substantial decrease in stability to electrochemical corrosion.

2. The dehalogenation process of claim 1 wherein the carbonaceous cathode is a three-dimensional material selected from the group consisting of carbon felt and carbon cloth.

3. The dehalogenation process of claim 1 wherein the carbonaceous cathode is felt, which felt comprises partially graphitized amorphous carbon.

4. The dehalogenation process of claim 3 wherein the carbonaceous felt cathode comprises principally amorphous carbon having at least 5 percent by weight graphitic carbon.

5. The dehalogenation process of claim 1 wherein the electrolyte is nonaqueous and the carbonaceous cathode comprises a felt which is partially graphitized amorphous carbon.

6. The dehalogenation process of claim 1 wherein the electrolyte is nonaqueous and comprises a chlorinated aromatic compound.

7. The dehalogenation process of claim 6 wherein the chlorinated aromatic compounds are polychlorinated biphenyls.

8. The dehalogenation process of claim 7 wherein the level of polychlorinated biphenyls in the electrolyte is reduced to less than 1 ppm.

9. The dehalogenation process of claim 1 wherein the electrolyte is an emulsion and comprises a chlorinated aromatic compound.

10. In a process for removing a halogenated aromatic compound from a liquid carrier contaminated therewith and dehalogenating said compound by the steps of extracting and separating said halogenated compound from said carrier with an organic solvent to form a carrier having a reduced level of halogenated aromatic compound and an organic solvent enriched in said compound, and electrolyzing said halogenated aromatic compound electrolyte which is nonaqueous in an electrolytic cell having an anode and a cathode by impressing a voltage across said anode and cathode, the improvement comprising conducting the dehalogenation reaction in the presence of an electrochemically corrosion resistant, porous, high surface area carbonaceous cathode.

11. The dehalogenation process of claim 10 wherein the halogenated aromatic compound comprises polychlorinated biphenyls and the cathode is formed from a material selected from the group consisting of carbon felt and carbon cloth, said materials being amorphous carbon sufficiently graphitized to enchance dehalogenation without substantial reduction in stability to electrochemical corrosion.

12. In a process for the dehalogenation of organic compounds by the steps of providing an electrolytic cell having an anode, a cathode and an electrolyte comprising a halogenated organic compound, and impressing a voltage across an anode and cathode sufficient to reduce the halogenated organic compound at the cathode, the improvement comprising carrying out the reaction by conducting the electrolyte comprising the halogenated organic compound through a cathode comprising a bed of particulate carbon.

13. The dehalogenation process of claim 12 wherein the electrolytic cell is equipped with a separator between said anode and cathode.

14. The dehalogenation process of claim 12 wherein the cathode comprises a bed of particulate carbon in intimate contact, selected from the group consisting of amorphous carbon and partially graphitized amorphous carbon.

15. The dehalogenation process of claim 14 wherein the halogenated organic compound is a chlorinated aromatic compound.

16. The dehalogenation process of claim 15 wherein the chlorinated aromatic compounds are polychlorinated biphenyls.

17. The process of claim 15 wherein the bed of particulate carbon is a packed bed.

18. The process of claim 16 wherein the particulate carbon bed is a fluidized bed.

* * * * *